United States Patent
Li et al.

(10) Patent No.: US 12,464,007 B2
(45) Date of Patent: Nov. 4, 2025

(54) SYSTEMS AND METHODS FOR MEASURING TRUST

(71) Applicant: PwC Product Sales LLC, New York, NY (US)

(72) Inventors: Chung-Sheng Li, Scarsdale, NY (US); Luisa Breidt, Long Island City, NY (US); Kazi Islam, Broomall, PA (US); Jeffrey Kevin Dicker, West Hempstead, NY (US); Matthew Lawrence Messina, New York, NY (US); Ali Rusta-Sallehy, Lafayette, CA (US); Winnie Cheng, West New York, NJ (US); Joseph David Voyles, Louisville, KY (US); Scott Likens, Austin, TX (US); Anand Srinivasa Rao, Lexington, MA (US)

(73) Assignee: PwC Product Sales LLC, New York, NY (US)

( * ) Notice: Subject to any disclaimer, the term of this patent is extended or adjusted under 35 U.S.C. 154(b) by 251 days.

(21) Appl. No.: 18/178,148

(22) Filed: Mar. 3, 2023

(65) Prior Publication Data
US 2024/0297891 A1    Sep. 5, 2024

(51) Int. Cl.
*H04L 9/40* (2022.01)
*G06F 16/22* (2019.01)

(52) U.S. Cl.
CPC .......... *H04L 63/1433* (2013.01); *G06F 16/22* (2019.01)

(58) Field of Classification Search
CPC ............ H04L 63/1433; H04L 67/1053; H04L 67/1057; G06F 16/22; H04W 12/08; H04W 12/67
See application file for complete search history.

(56) References Cited

U.S. PATENT DOCUMENTS

| | | | |
|---|---|---|---|
| 2013/0013684 A1* | 1/2013 | Miller | G06Q 10/10 709/204 |
| 2013/0291098 A1 | 10/2013 | Chung | |
| 2015/0373049 A1 | 12/2015 | Sharma | |
| 2016/0197788 A1 | 7/2016 | Chrapko | |
| 2017/0301038 A1* | 10/2017 | Mawji | H04W 12/66 |

FOREIGN PATENT DOCUMENTS

WO   WO-2022237963 A1 * 11/2022 ........... H04L 41/145

OTHER PUBLICATIONS

Aguiar et al. (May 2022). "What AI Reveals About Trust in the World's Largest Companies," BCG Trust Index; pp. 1-8.
(Continued)

*Primary Examiner* — Kostas J Katsikis
(74) *Attorney, Agent, or Firm* — Morrison & Foerster LLP

(57) ABSTRACT

An entity trust index relating to an entity may indicate a trustworthiness level of the entity. To generate an entity trust index, entity information may be received from one or more information sources. Using the entity information and one or more machine learning models, a performance index, an innovation index, and a sustainability index for the entity may be generated. The entity trust index may be generated based on the performance index, the innovation index, and the sustainability index. One or more actions for the entity that will modify the entity trust index may then be determined.

29 Claims, 12 Drawing Sheets

(56) References Cited

OTHER PUBLICATIONS

CognitiveScale. (May 2022). "Using an AI Trust Index to Unblock Stalled Machine Learning & AI Projects," located at https://web.archive.org/web/20220516054239/https://www.cognitivescale.com/using-an-ai-trust-index-to-unblock-stalled-machine-l;earning-ai-projects/, visited on Mar. 13, 2025. (5 pages).
Delgado. (Sep. 2020). "Introducing the Retail Brand Trust Index: Consumer Trust Perception of Major US Retail Brands," located at https://www.mcmillandoolittle.com/introducing-the-retail-brand-trust-index-consumer-trust-perception-of-major-us-retail-brands/; pp. 1-7.
Edelman. (2022). "Edelman Trust Barometer 2022, Global Report;" 72 pages.
Graham Media Group. (Jun. 2020). "Introducing Trust Index: Our commitment to fighting misinformation with journalism, facts," located at https://www.clickorlando.com/news/2020/06/09/introducing-trust-index-our-commitment-to-fighting-misinformation-with-journalism-facts/, visited on Mar. 27, 2024. (8 pages).
International Search Report and Written Opinion mailed Sep. 28, 2023, directed to International Application No. PCT/US2023/063667; 9 pages.
Jebbit. (Jul. 2021). "Jebbit Releases Fifth Consumer Data Trust Index Revealing a Roller Coaster Year for Brands' Impact on Consumer Trust," located at https://www.jebbit.com/blog/fifth-consumer-data-trust-index; pp. 1-7.
May. (Aug. 2019). "An Overview of Approaches to Privacy-Preserving Data Sharing," located at https://medium.com/datavant/an-overview-of-approaches-to-privacy-preserving-data-sharing-64fc5d4a9b48; pp. 1-18.
OECD. (2017). "OECD Guidelines on Measuring Trust," OECD Publishing, Paris; pp. 1-211.
Okta. (2021). "The Okta Digital Trust Index." located at https://www.okta.com/sitees/default/files/2021-09/Otka%20-%20Digital%20Trust%20Report%20UK.pdf, visited on Oct. 25, 2022. (13 pages).
Reichheld et al. (Jul. 2020). "A new measure of trust for consumer industries," located at https://www.deloittedigital.com/content/dam/deloittedigital/us/documents/offerings/offering-20200706-hub-trust-hx.pdf, visited on Mar. 13, 2022. (5 pages).
Sana Editorial Team. (Dec. 2021). "The B2B e-commerce trust index: What do buyers really look for?," located at https://www.sana-commerce.com/blog/b2b-e-commerce-trust-index/; 8 pages.
Sapienza et al. (Feb. 2021), "Chicago Booth/Kellogg School Financial Trust Index reveals highest level of anger about the economy since 2013," Chicago Booth/Kellogg School Financial Trust Index. (2 pages).
Trust Edge Leadership Institute. (Nov. 2020). "Enterprise Trust Index;" 5 pages.
Uncovered Health. (2020). "Un-Covered Present The 2020 Trust Index," located at https://www.uncovered.health/features/2020-trust-index/, visited on Mar. 27, 2024. (8 pages).
VCMIntegrity.org. (Jul. 2021). "Working Paper—Use Cases and Case Studies of Company Climate Commitments," VCMI Voluntary Carbon Markets Integrity Initiative, pp. 1-28.
Wikipedia. (2022) "Zero-knowledge proof," located at https://en.wikipedia.org/wiki/Zero-knowledge_proof, visited on Dec. 21, 2022. (17 pages).

\* cited by examiner

FIG. 9A
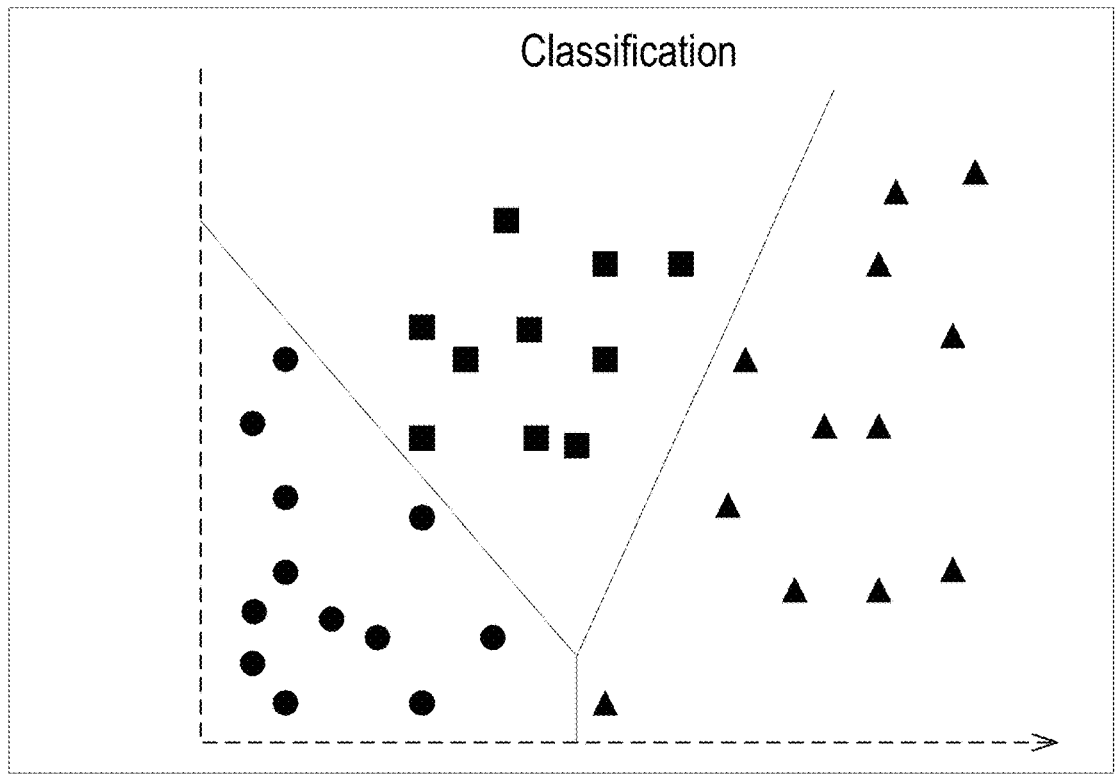
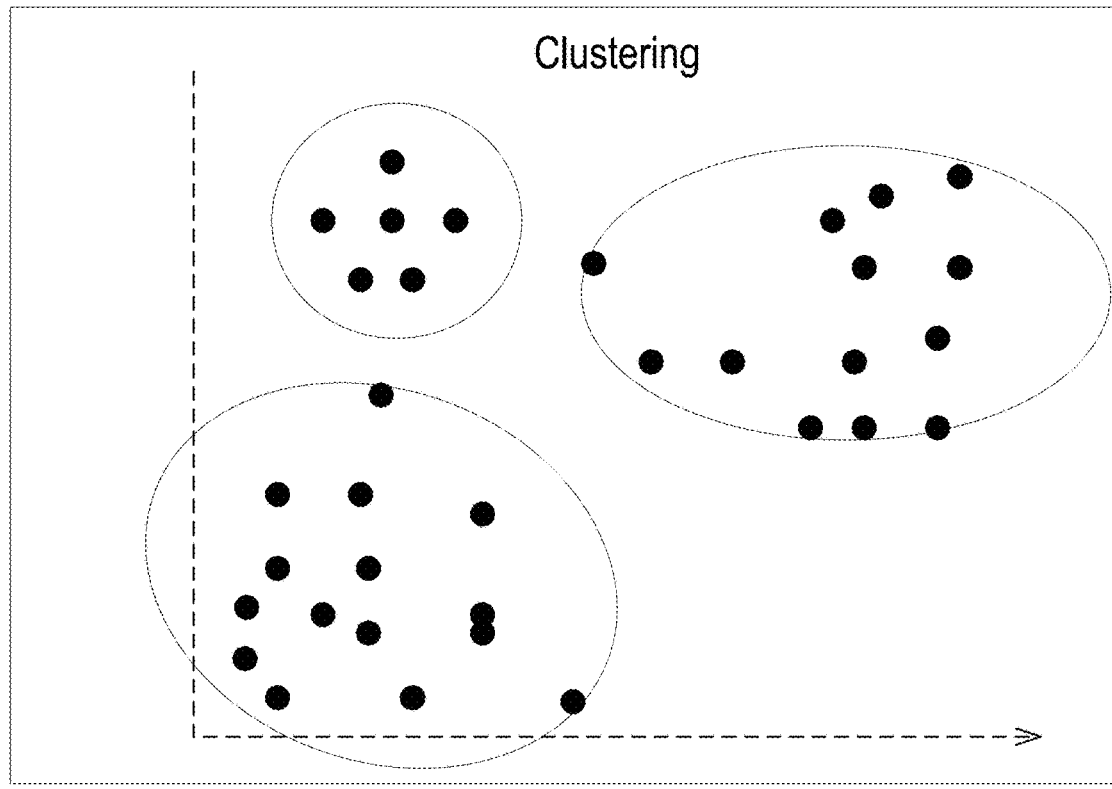
FIG. 9B

FIG. 9C
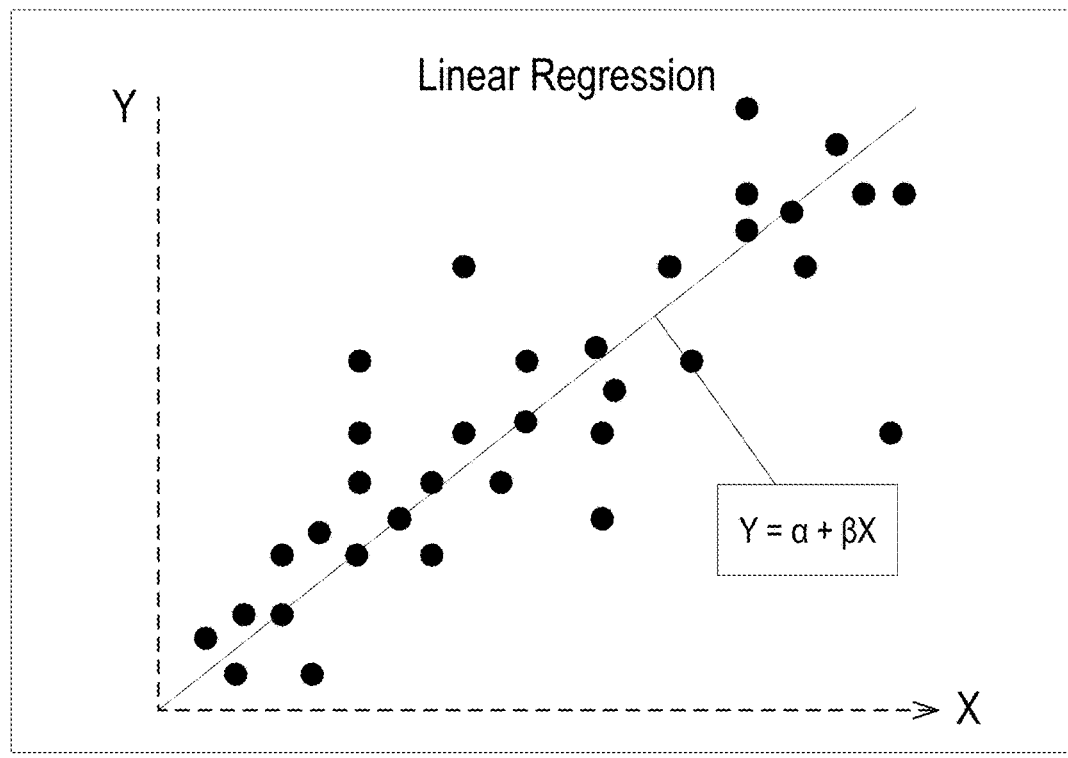
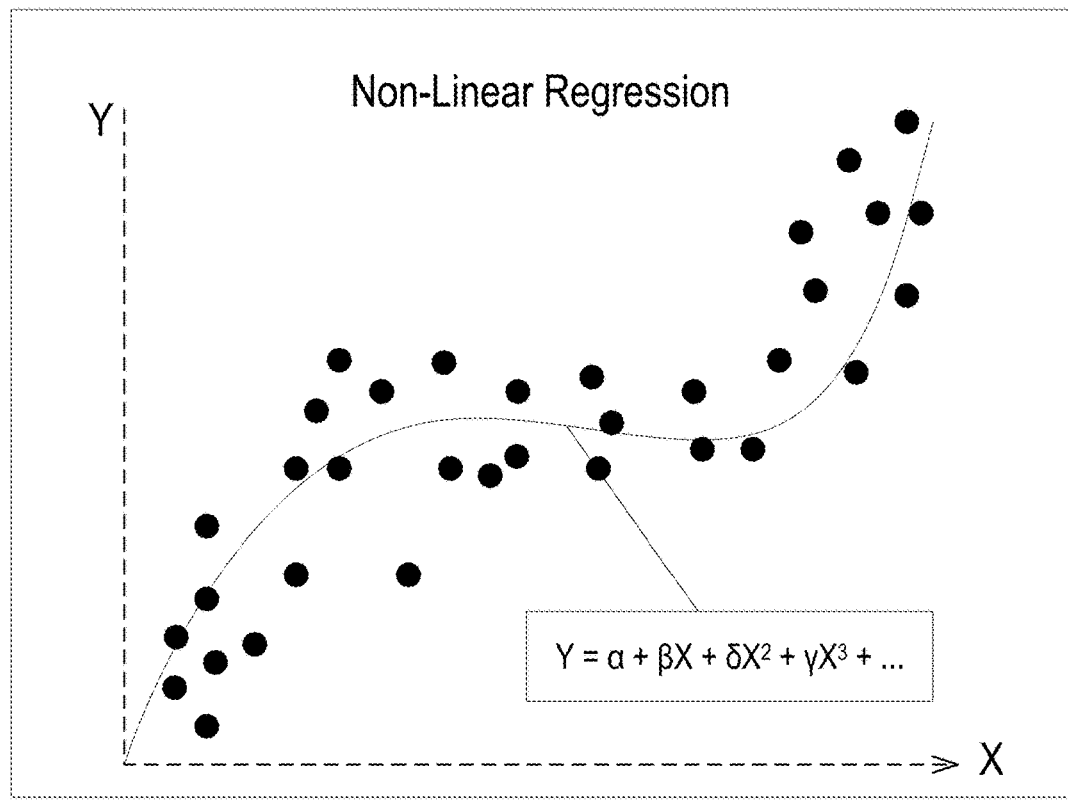
FIG. 9D

SYSTEMS AND METHODS FOR MEASURING TRUST

FIELD

The present disclosure relates to techniques for measuring the trustworthiness of an entity, for example an entity that provides a product or a service.

BACKGROUND

Decisions about whether to engage with an entity to, for example, receive a product or a service provided by the entity are frequently based in trust. Customers exhibit loyalty to companies that they believe will act consistently or are capable of achieving certain objectives. Conversely, businesses that are perceived to behave inconsistently (e.g., have poor quality control) may lose customer patronage due to a lack of trust.

Accurate and holistic assessments of the trustworthiness of an entity can be useful to those who interact with the entity as well as to the entity itself. However, attaining such assessments can be quite challenging. Conventional methods for determining an entity's trustworthiness involve conducting surveys with individuals who have interacted with the entity, but surveys are inherently subjective due to the wide variety of factors that can influence an individual's perception of an entity's trustworthiness. Furthermore, designing and conducting surveys requires substantial time commitment which can drive up costs for entities that wish to use the surveys to improve their practices.

SUMMARY

There is need for efficient and cost-effective approaches for accurately measuring the trustworthiness of entities such as corporations and institutions.

Accordingly, described are systems and methods for generating an entity trust index relating to an entity. The entity trust index may provide a comprehensive measure of an entity's trustworthiness based on factors including the entity's market share, the technology produced by the entity, and the entity's sustainable (e.g., pollution-reducing, low-carbon, energy efficient, etc.) practices. These factors may be extracted from entity information received from an assortment of information sources, including investment analyses, patent portfolios, technology blogs, social media platforms, and sustainability indices. Once extracted, the factors may be combined by trained machine learning models to generate metrics corresponding to the entity's performance level, the competitiveness of the entity's innovations, and the entity's commitment to sustainability. The metrics generated by the machine learning models may then be consolidated to produce the entity trust index for the entity.

The entity trust index, once generated, can be utilized in a variety of ways. If the party requesting the generation of the entity trust index is the entity itself (or, e.g., a representative of the entity), the provided systems may use the entity trust index to automatically determine courses of action that the entity could take to improve its trustworthiness. For example, the systems may automatically identify changes to the entity's business strategy, budget, or other policies that could increase the entity's trust index value. If the party requesting the generation of the entity trust index is one who is interested in potentially engaging with the entity, the described systems may use the entity trust index to automatically determine potential risks and benefits to the requesting party if they do engage with the entity or, (if the entity trust index is low), to automatically recommend other, similar entities are more trustworthy than the entity in question.

Unlike conventional trust assessment methods, the techniques provided herein may be capable of generating and updating entity trust indices in real-time (e.g., as information about the entity is received). Additionally, the machine learning models may be configured to generate and incorporate predictions about future behavior or performance by the entity into the entity trust index. This may allow the entity and those who may engage with the entity to determine whether the entity's current practices are likely to benefit the entity in the future.

A method for generating an entity trust index relating to an entity may comprise receiving entity information from one or more information sources, automatically, in response to receiving the entity information, generating, using the entity information and one or more machine learning models, a performance index (P) that corresponds to a current performance state of the entity and a likely future performance state of the entity, an innovation index (I) that corresponds to a competitiveness of the entity's innovations, and a sustainability index (S) that corresponds to a level of commitment by the entity to sustainable practices, and automatically, in response to generating the performance index, the innovation index, and the sustainability index, generating an entity trust index (TI) that indicates a trustworthiness level of the entity based on the performance index, the innovation index, and the sustainability index.

In some embodiments, the method comprises determining, for the entity, based on the entity trust index, one or more actions for the entity that will modify the entity trust index.

In some embodiments of the method, determining the one or more actions for the entity that will modify the entity trust index comprises receiving, from a rules database, a plurality of rules associating actions for the entity with deviations of the entity trust index from a target trust index value, comparing the entity trust index to the target trust index value, and selecting the one or more actions for the entity based on a difference between the entity trust index and the target trust index value and a rule of the plurality of rules that corresponds to the difference between the entity trust index and the target trust index value.

In some embodiments of the method, the one or more actions for the entity are further based on the performance index, the innovation index, and the sustainability index.

In some embodiments, the method comprises automatically, in response to receiving the entity information, generating, using entity information and the one or more machine learning models, a confidence level of the performance index ($C_P$) that corresponds to uncertainty associated with an accuracy of the performance index, a confidence level of the innovation index ($C_I$) that corresponds to uncertainty associated with an accuracy of the innovation index, and a confidence level of the sustainability index ($C_S$) that corresponds to uncertainty associated with an accuracy of the sustainability index.

In some embodiments of the method, each of the one or more information sources has an associated uncertainty measure, and wherein one or more of the confidence level of the performance index, the confidence level of the innovation index, and the confidence level of the sustainability index are generated using uncertainty measures of at least one of the one or more information sources.

In some embodiments, the method comprises automatically, in response to generating the confidence level of the performance index, the confidence level of the innovation index, and the confidence level of the sustainability index, generating a confidence score for the entity trust index ($C_{TI}$) that corresponds to uncertainty associated with an accuracy of the entity trust index.

In some embodiments, the method comprises determining, for the entity, based on the entity trust index and the confidence score for the entity trust index, one or more actions for the entity that will modify the entity trust index.

In some embodiments, the method comprises receiving, from the one or more information sources, updated entity information, automatically, in response to receiving the updated entity information, generating, using the updated entity information and the one or more machine learning models, one or more of: an updated performance index, an updated innovation index, and an updated sustainability index, and automatically, in response to generating one or more of the updated performance index, the updated innovation index, and the updated sustainability index, generating an updated entity trust index that indicates an updated trustworthiness level of the entity based on the updated performance index, the updated innovation index, and/or the updated sustainability index.

In some embodiments of the method, the steps of receiving the entity information, generating the performance index, the innovation index, and the sustainability index, and generating the entity trust index are performed in real-time.

In some embodiments of the method, generating the entity trust index comprises determining a weighted combination of the performance index, the innovation index, and the sustainability index.

In some embodiments of the method, in the weighted combination, the performance index is weighted by a performance weight ($a_p$) that corresponds to a relative importance of the current performance state of the entity and the likely future performance state of the entity to the trustworthiness level of the entity, the innovation index is weighted by an innovation weight ($a_i$) that corresponds to a relative importance of the competitiveness of the entity's innovations to the trustworthiness of the entity, and the sustainability index is weighted by a sustainability weight ($a_s$) that corresponds to a relative importance of the level of commitment by the entity to sustainable practices innovations to the trustworthiness of the entity.

In some embodiments of the method, the entity trust index is given by the following equation: $TI=a_pP+a_iI+a_sS$.

In some embodiments of the method, the entity trust index is a number between 0 and 1.

In some embodiments, the method comprises training the one or more machine learning models to generate the performance index, the innovation index, and the sustainability index.

In some embodiments of the method, generating the performance index comprises generating one or more current performance metrics corresponding to the current performance state of the entity using the entity information and determining performance trend information corresponding to the likely future performance state of the entity based on the one or more current performance metrics. The one or more machine learning models may generate the performance index using the one or more current performance metrics and the performance trend information.

In some embodiments of the method, generating the innovation index comprises generating one or more current innovation metrics corresponding to a current innovation state of the entity using the entity information and determining innovation trend information corresponding to a likely future innovation state of the entity based on the one or more current innovation metrics. The one or more machine learning models may generate the innovation index using the one or more current innovation metrics and the innovation trend information.

In some embodiments of the method, generating the sustainability index comprises extracting a plurality of sustainability metrics from the entity information, wherein each of the plurality of sustainability metrics is associated with one or more sustainability attributes, classifying the plurality of sustainability metrics into one or more categories based on the sustainability attributes associated with each sustainability metric, and generating a sustainability category score for each of the one or more categories. The one or more machine learning models may be configured to generate the sustainability index using the sustainability category scores for each of the one or more categories.

In some embodiments of the method, the entity information comprises entity performance information.

In some embodiments of the method, the entity performance information comprises one or more of: market information associated with the entity, product/service information associated with the entity, and public sentiment information associated with the entity.

In some embodiments of the method, the entity information comprises entity innovation information.

In some embodiments of the method, the entity innovation information comprises one or more of: research and development information associated with the entity, intellectual property information associated with the entity, technical publication information associated with the entity, and open-source innovation information associated with the entity.

In some embodiments of the method, the entity information comprises publicly available information.

In some embodiments of the method, the one or more information sources comprise one or more of: a public disclosure, an agency rating, a government database, a news outlet, an investment analysis, a customer review, a user forum, and a social media platform.

In some embodiments of the method, the entity is a product, a technology, a service, an individual, an institution, or a company.

In some embodiments, the method comprises automatically configuring a physical or electronic security setting for a party associated with the entity based on the entity trust index.

In some embodiments, the method comprises automatically configuring an electronic communication interface between the entity and a party associated with the entity based on the entity trust index.

A system for generating an entity trust index relating to an entity may comprise one or more processors configured to receive entity information from one or more information sources, automatically, in response to receiving the entity information, generate, using the entity information and one or more machine learning models, a performance index (P) that corresponds to a current performance state of the entity and a likely future performance state of the entity, an innovation index (I) that corresponds to a competitiveness of the entity's innovations, and a sustainability index (S) that corresponds to a level of commitment by the entity to sustainable practices, and automatically, in response to generating the performance index, the innovation index, and the sustainability index, generate an entity trust index (TI) that indicates a trustworthiness level of the entity based on the performance index, the innovation index, and the sustainability index.

A non-transitory computer readable storage medium may store instructions for generating an entity trust index relating to an entity, wherein the instructions, when executed by one or more processors of an electronic device, cause the device to receive entity information from one or more information sources, automatically, in response to receiving the entity information, generate, using the entity information and one or more machine learning models, a performance index (P) that corresponds to a current performance state of the entity and a likely future performance state of the entity, an innovation index (I) that corresponds to a competitiveness of the entity's innovations, and a sustainability index (S) that corresponds to a level of commitment by the entity to sustainable practices, and automatically, in response to generating the performance index, the innovation index, and the sustainability index, generate an entity trust index (TI) that indicates a trustworthiness level of the entity based on the performance index, the innovation index, and the sustainability index.

BRIEF DESCRIPTION OF THE FIGURES

The following figures show various systems and methods for generating an entity trust index that captures the trustworthiness of an entity. The systems and methods shown in the figures may, in some embodiments, have any one or more of the characteristics described herein.

FIG. 9A illustrates an exemplary output from an exemplary machine learning model, according to some embodiments of the disclosure.

FIG. 9B illustrates an exemplary output from an exemplary machine learning model, according to some embodiments of the disclosure.

FIG. 9C illustrates an exemplary output from an exemplary machine learning model, according to some embodiments of the disclosure.

FIG. 9D illustrates an exemplary output from an exemplary machine learning model, according to some embodiments of the disclosure.

DETAILED DESCRIPTION

Comprehensive evaluations of an entity's trustworthiness can provide invaluable insight about the entity to parties who may be interested in engaging with the entity or, in some circumstances, to the entity itself. The systems and methods provided herein may generate a numerical measure of trustworthiness based on entity information extracted from a large array of information sources. This numerical trustworthiness measure, or "entity trust index", can be produced in real-time as new information about an entity is made available. Artificial intelligence techniques can be employed at various stages of the process of generating an entity trust index, for example to incorporate predictions about the entity's future behavior into the entity trust index. Accordingly, the entity trust index may provide the entity and parties considering engaging with the entity with insight into the ways in which the entity's current practices are affecting the entity's public image without requiring excessive labor, time, or money from the entity or the party in interest. Once generated, the entity trust index may be used to automatically determine courses of action that the entity could take to improve its trustworthiness or to automatically recommend other, similar entities are more trustworthy than the entity in question. Additionally, the entity trust index may be employed to train artificial intelligence models to determine an entity's trustworthiness.

The described systems and methods may be useful to a variety of parties. For example, entities may use the provided systems to quantify and automatically monitor their trustworthiness in order to identify potential areas for improvement. Investors may employ the systems and methods to assess potential investment opportunities. Businesses may utilize the systems and methods to select vendors or suppliers. Consulting firms can use the provided systems when helping clients assess and improve their trustworthiness. Automated systems may use assessments of trustworthiness as described herein to automatically adjust one or more protocols or settings for physical and/or electronic security (e.g., by increasing security when in the presence of one or more parties with lower trustworthiness), to automatically adjust one or more electronic communication protocols or settings (e.g., to allow communication with trustworthy parties and/or to disallow communication with untrustworthy parties), and/or to automatically trigger one or more automated system functionalities (e.g., functionalities that should only be performed in the presence of trustworthy parties or that should be performed when dealing with untrustworthy parties).

Systems for Generating an Entity Trust Index

Figure 1:
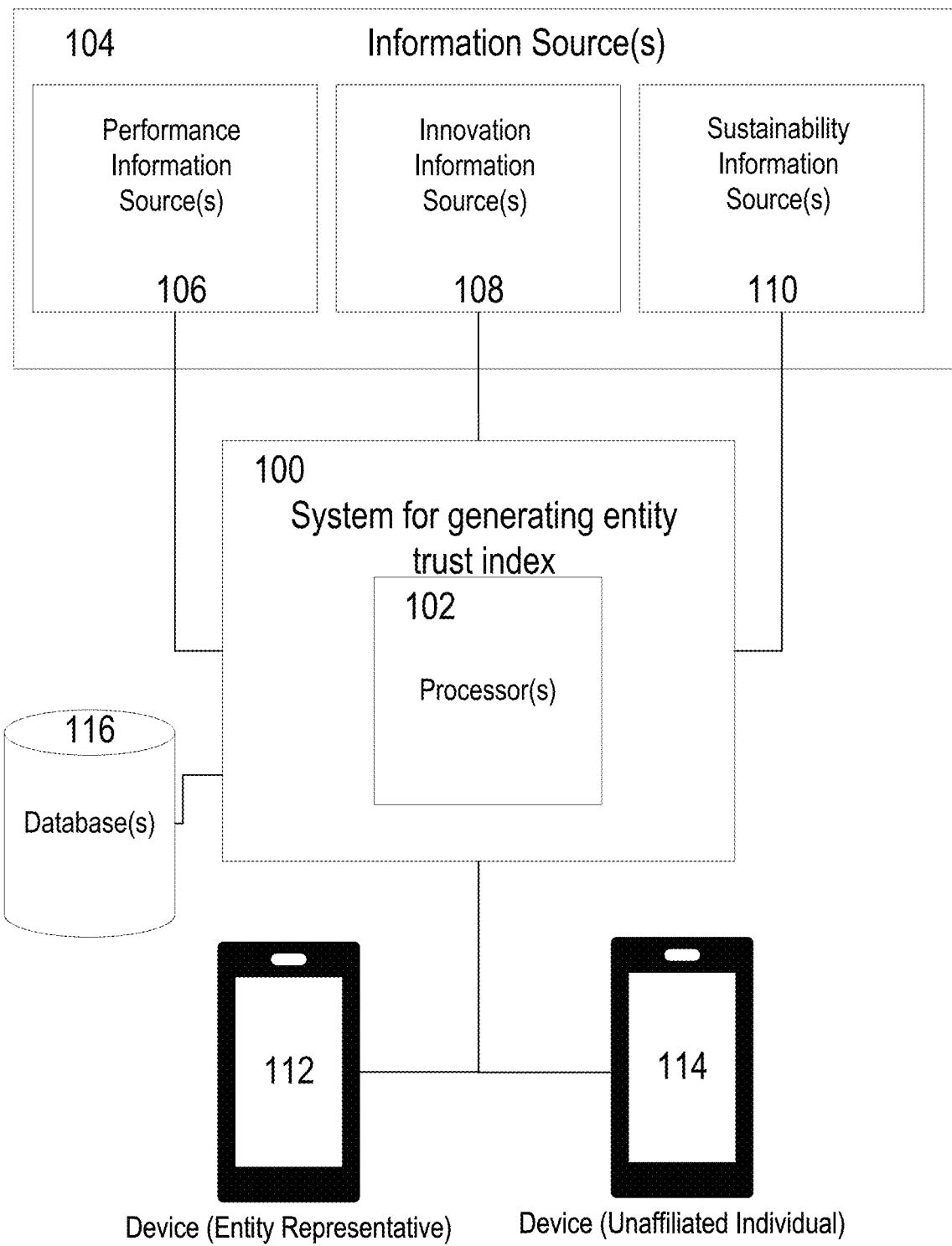
FIG. 1 shows a system for generating an entity trust index relating to an entity, according to some embodiments of the disclosure.

The techniques provided herein may be executed by a system configured to generate an entity trust index. An exemplary system 100 for generating an entity trust index relating to an entity is shown in FIG. 1. System 100 may comprise one or more processors 102 and may be configured to communicate with a plurality of information sources 104 that provide information about the entity. Additionally, system 100 may be configured to communicate with one or more user devices, for example a device 112 belonging to an entity representative or a device 114 belonging to an individual who is not affiliated with an entity but who may be interested in learning about the entity's trustworthiness.

System 100 may be implemented on one or more computing devices. The computing devices may include one or more servers, one or more client computers, one or more personal computers (PCs), one or more laptop computers, one or more tablet computers, and/or one or more smart phones. Processors 102 may comprise one or more central processing units (CPUs) or one or more graphics processing units (GPUs). In some embodiments, system 100 may be a single device; in others, system 100 may be a network of interconnected devices that individually or jointly execute steps for generating an entity trust index.

Instructions requesting that an entity trust index for an entity be generated may be transmitted to system 100 by an entity representative using device 112 or an individual interested in learning about the entity's trustworthiness using device 114. The entity may be a business entity (e.g., a corporation, a limited liability company (LLC), a sole proprietorship, or partnership), a non-profit organization (e.g., a charity, a religious entity, or a private foundation), an educational institution (e.g., a university), a technology, a product, a service, or an individual. The instructions received from device 112 or device 114 may include identifying information about the entity such as the entity's legal name, the entity's stock symbol, or the entity's industry sector.

Based on the identifying information in the instructions, system 100 may determine appropriate information sources 104 from which to receive information about the entity. The information sources 104 to which system 100 has access may include public disclosures, agency ratings, trading platforms, government databases, news outlets, investment analyses, technology blogs, customer review websites, social media platforms, technical and scientific publications, and forums. In particular, information sources 104 may include performance information sources 106, innovation information sources 108, and sustainability information sources 110.

Performance information sources 106 may be information sources that provide information associated with the entity's performance—e.g., information associated with the entity's perceived ability to deliver upon its promises. In some embodiments, the entity performance information supplied by performance information sources 106 may include market information associated with the entity's market performance or market position, rating information associated with the entity's financial health, product information associated with products produced or supplied by the entity, service information associated with services provided or received by the entity, and/or information related to public sentiment about the entity.

Innovation information sources 108 may be information sources that provide information associated with the entity's innovations. The entity's innovations may be technological or scientific innovations or innovations directly related to the industry to which the entity belongs (e.g., innovations in management strategies, innovations in business strategies, innovations in production strategies, etc.). In some embodiments, the entity innovation information supplied by innovation information sources 108 may include information about the entity's intellectual property, information about the entity's technical publications (e.g., number of publications, number of citations per publication, etc.), information about the entity's research and development strategies and expenditure, and/or information about the entity's open-source technologies.

Sustainability information sources 110 may be information sources that provide information associated with the entity's sustainability practices. The sustainability information associated with the entity may include evaluations of the impact of the entity's practices and behaviors various ecological, social, and economic environments. For example, the entity sustainability information supplied by sustainability information sources 110 may comprise an analysis or a measurement environmental waste or pollution produced by the entity or an analysis of the environmental impact of products/services supplied by the entity.

System 100 may receive entity information-including entity performance information, entity innovation information, and entity sustainability information-from information sources 104. Upon receiving the entity information, system 100 may be configured to quantify the entity's behavior with respect to a plurality of variables that may influence the entity's trustworthiness. These variables, or "trust dimensions", may include performance, innovation, and sustainability. System 100 may quantify the entity's behavior with respect to each of these trust dimensions by automatically generating numerical indices corresponding to each dimension using the entity information received from information sources 104. The indices generated by system 100 may include a performance index, an innovation index, and a sustainability index.

In some embodiments, system 100 may be configured to generate indices associated with the trust dimensions automatically upon receipt of the entity information from information sources 104. The indices may be generated using artificial intelligence techniques. For example, processors 102 may be configured to execute one or more machine learning models in order to generate the performance index, the innovation index, and the sustainability index using the entity information.

Figure 2:
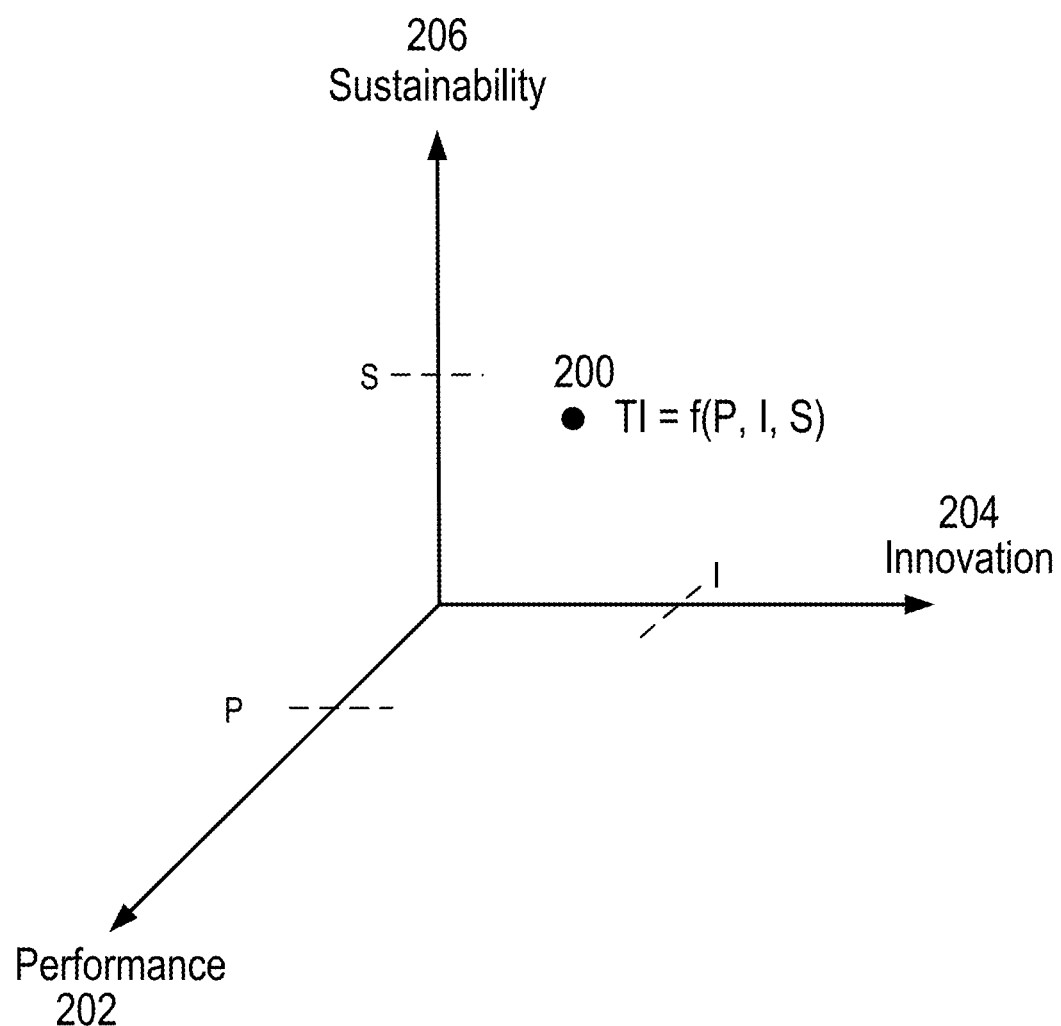
FIG. 2 shows a graphical representation of a trust dimensions used to evaluate the trustworthiness of an entity, according to some embodiments of the disclosure.

A graphical representation of exemplary trust dimensions according to which an entity may be scored is shown in FIG. 2. A first dimension, the performance dimension, may be represented by a first axis 202. The performance dimension may measure market performance and ability to deliver upon promises (e.g., to customers, stakeholders, suppliers, employees, investors, and the like). A second dimension, the innovation dimension, may be represented by a second axis 204. The innovation dimension may measure strength and competitiveness of products and services. A third dimension, the sustainability dimension, may be represented by a third axis 206. The sustainability dimension may measure creation of long-term ecological, social, and economic value.

An entity trust index (TI) relating to an entity may be generated by "scoring" the entity along each of the trust dimensions. The performance index (P) for the entity may a numerical score associated with the performance dimension and may correspond to the entity's current performance state and, in some embodiments, a likely future performance state of the entity. The innovation index (I) for the entity a numerical score associated with the innovation dimension and may correspond to the competitiveness of the entity's innovations. Finally, the sustainability index (S) may be a numerical score associated with the sustainability dimension and may correspond to a level of commitment by the entity to various sustainable practices. Each of the performance index, the innovation index, and the sustainability index may be respectively represented as a point along axis 202, axis 204, and axis 206. The entity trust index (200) may be represented as a point in the three-dimensional space defined by the performance dimension, the innovation dimension, and the sustainability dimension. Its value may be given by a function $f(P, I, S)$ that depends on the performance index, the innovation index, and the sustainability index for the entity. The function used to determine an entity trust index for an entity may be programmed into processors of a system configured to generate an entity trust index (e.g., system 100 shown in FIG. 1) or may be a model generated by the processors of the system (e.g., using machine learning techniques.

Trust dimensions in addition to (or alternatively to) performance, innovation, and/or sustainability may be used when generating an entity trust index. Exemplary alternative or additional trust dimensions include entity competence (e.g., competence in a specified area of production, innovation, or research), entity motives, entity means, entity impact, entity reliability, humanity (e.g., the manner in which the entity treats its employees and/or its customers), entity capability, entity transparency, entity reliability, entity resiliency (e.g., resiliency to economic shocks), entity timeliness, and entity accessibility.

Much of the entity information may be subjective or qualitative assessments of the entity (e.g., customer reviews) rather than objective or quantitative statistics related to the entity (e.g., stock prices). As such, a certain amount of uncertainty may be associated with at least a portion of the entity information received from information sources 104. System 100 may be configured to account for uncertainty in the entity information by generating confidence levels for each of the generated indices. For example, system 100 may be configured to generate a confidence level of the performance index, a confidence level of the innovation index, and a confidence level of the sustainability index. The confidence level for each index may quantify system 100's confidence in the accuracy of the index's value. In some embodiments, the confidence levels for the indices may be generated using machine learning models such as those used to generate the indices.

Based on the generated indices (e.g., the performance index, the innovation index, and the sustainability index), system 100 may, using processors 102, automatically generate an entity trust index relating to the entity. The entity trust index may be a numerical value that indicates a trustworthiness level of the entity. In some embodiments, system 100 may also be configured to generate a confidence score for the entity trust index that corresponds to uncertainty associated with the accuracy of the value of the entity trust index. System 100 may generate the confidence score for the entity trust index using the confidence levels for the indices associated with the trust dimensions.

After generating the entity trust index, system 100 may be configured to generate recommendations for the entity or a party interested in engaging with the entity based on the entity trust index. Recommendations generated for the entity may comprise actions that should be taken by the entity if the entity wishes to improve its entity trust index. Recommendations for a party interested in engaging with the entity may comprise indications as to whether or not the party should proceed with engaging with the entity or, if the entity trust index is low, suggestions for alternative entities that provide the same products or services as the entity being assessed.

In some embodiments, the recommendations may be based upon portions of the entity information that system 100 determines to have significantly influenced the value of the entity trust index. For example, the entity information for the entity may indicate that the entity produces a high volume of environmental waste when manufacturing a product. This may negatively impact the entity trust index for the entity. System 100 may identify that the entity's waste production diminished the value of the entity trust index for the entity and may generate a recommendation that instructs the entity to increase the efficiency of their manufacturing processes. In some embodiments, system 100 may be configured to access one or more databases 116 when generating the recommendations. Databases 116 may store a plurality of rules that associated trust index values with certain actions that can be taken by the entity and/or a party interested in engaging with the entity.

In some embodiments, system 100 may be configured to receive entity information from information sources 104 as soon as the entity information is made available by information sources 104 (e.g., in real time). Thus, system 100 may be capable of generating—and updating—the entity trust index for an entity in real-time or near real-time as new entity information is supplied by information sources 104. The entity trust index, therefore, may always reflect the latest available data about the entity.

Following generation of the entity trust index, system 100 may be configured to transmit the entity trust index, along with the confidence score for the entity trust index and the recommendations for improving the entity trust index (if generated), to the entity and/or to individuals who are interested in determining the entity's trustworthiness (e.g., by outputting the entity trust index, the confidence score, and/or the recommendations to device 112 or device 114). In some embodiments, system 100 may be configured to make the entity trust index publicly available by, for example, automatically updating a webpage configured to provide trust information about one or more entities.

Methods for Generating an Entity Trust Index

Figure 3:
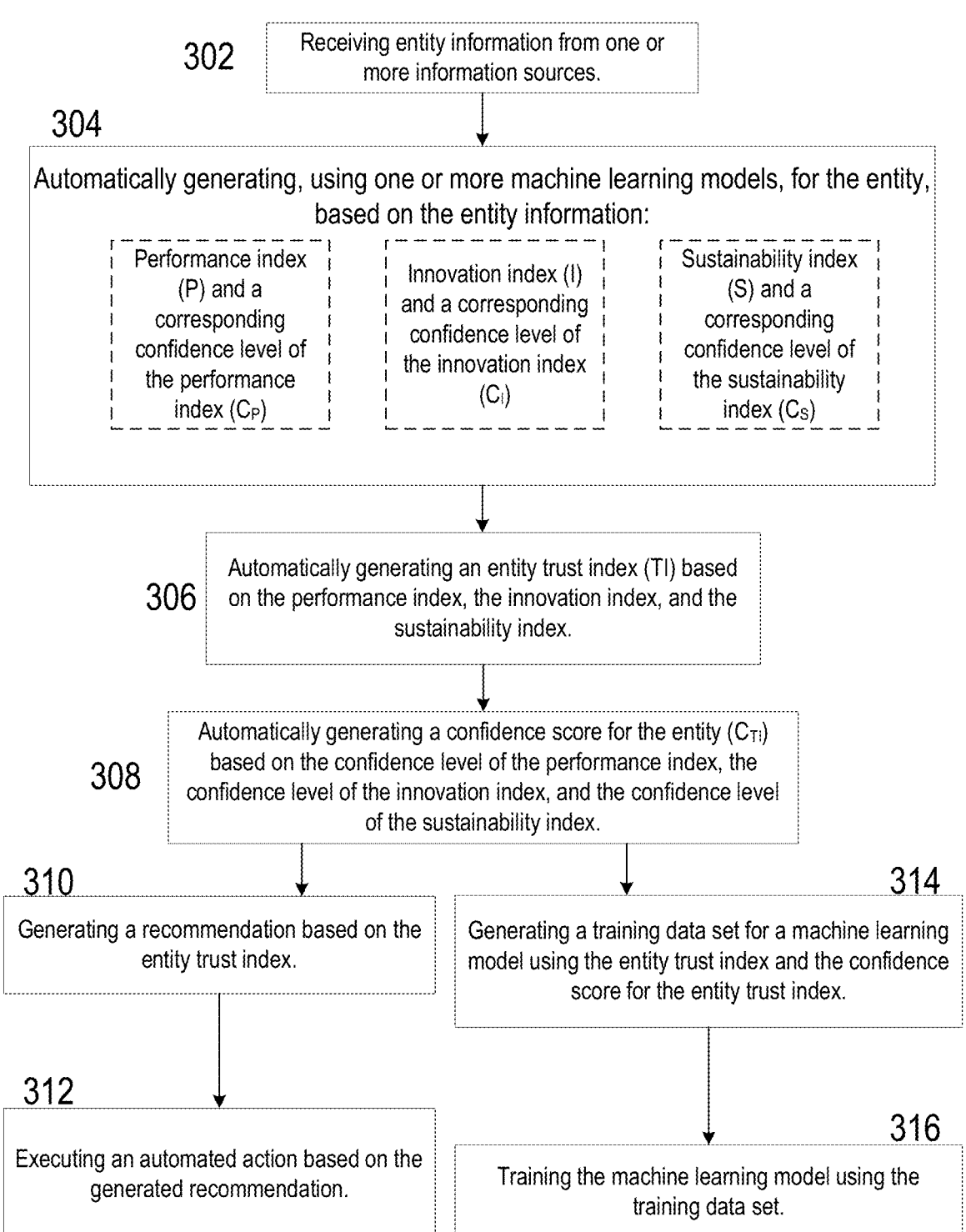
FIG. 3 shows a method for generating an entity trust index relating to an entity, according to some embodiments of the disclosure.

The described methods for generating an entity trust index may efficiently provide an accurate and holistic assessment of the trustworthiness of an entity without requiring excessive labor or human input. An exemplary method 300 for generating an entity trust index relating to an entity is shown in FIG. 3. Method 300 may be executed by a system for generating an entity trust index, such as system 100 shown in FIG. 1. In some embodiments, one or more steps of method 300 may be executed in real-time or in near real-time.

In a first step 302, after an entity of interest has been identified (e.g., by a party interested in determining the trustworthiness of the entity), entity information may be received from one or more information sources. The entity information sources may sources such as information sources 104 shown in FIG. 1. Specifically, the entity information sources may include sources that provide information about the entity's performance state, the entity's innovations, and the entity's commitment to sustainability.

The information sources that provide the entity information may be numerous and disparate and, as a result, the entity information may comprise a wide variety of information types, ranging from objective numerical data (e.g., financial information) to subjective text-based data (e.g., customer reviews). In order to effectively measure the entity's trustworthiness using such varied information, the entity may first be evaluated in the context of factors, or "trust dimensions", that may influence the entity's trustworthiness. These trust dimensions, as shown previously in FIG. 2, may include performance, innovation, and sustainability.

Accordingly, in a step 304, entity information received from the information sources in step 302 may be processed and used to automatically generate a performance index (P), an innovation index (I), and a sustainability index (S) for the entity. The performance index may be a measurement of the entity's current performance state (e.g., the entity's current ability to deliver upon its promises to stakeholders) and its likely future performance state (e.g., the likelihood that the entity will deliver upon its promises to stakeholders in the future). The innovation index may be a measurement of the competitiveness of the entity's innovations (e.g., as compared to other entities in the same industrial sector). The sustainability index may be a measurement of the entity's commitment to sustainable practices (e.g., waste reduction, renewable energy use, etc.).

The performance index, the innovation index, and the sustainability index may be numerical values. Optionally, the range of possible values that can be taken by one or more of the performance index, the innovation index, and the sustainability index may be 0-1, 0-5, 0-10, 0-20, 0-30, 0-40, 0-50, 0-60, 0-70, 0-80, 0-90, or 0-100. An index with a greater numerical value may indicate favorable behavior by the entity with respect to the trust dimension that corresponds to the index. For example, if the performance index can take values in the range 0-1, a performance index of 0.7 may indicate that the entity is more likely than not to deliver upon its promises to stakeholders, both currently and in the future. On the other hand, a performance index of 0.2 may indicate that the entity either currently fails to deliver upon its promises to stakeholders or that the entity may, at some point in the future, begin failing to deliver upon its promises to stakeholders.

One or more machine learning models may be employed to generate one or more of the performance index, the innovation index, and the sustainability index. In some embodiments, the machine learning models may include regression models, classification models, and/or clustering models. The machine learning models may generate the indices by identifying patterns and connections among various pieces of data contained in the entity information. Specifically, the machine learning models may be configured to use the entity information to make inferences about the entity's current state and predictions about the entity's future state (e.g., with respect to performance, innovation, and sustainability). Since the entity information that is available for a given entity may be unique to that entity, the machine learning models may be trained to be agnostic as to entity type and to be resilient to differences in available entity information.

Figure 4:
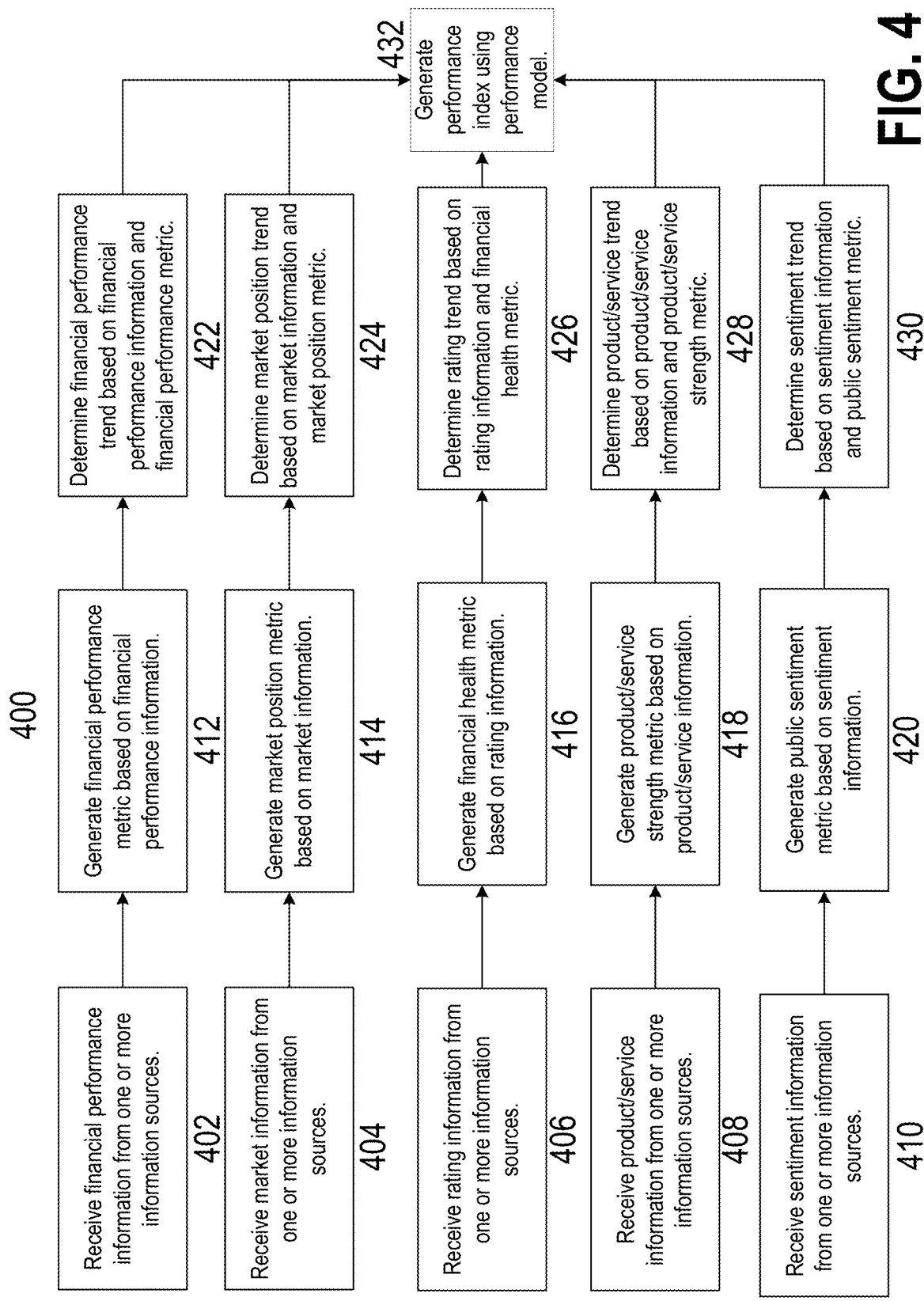
FIG. 4 shows a method for generating a performance index, according to some embodiments of the disclosure.

FIG. 4 shows an exemplary method 400 for generating a performance index relating to an entity. First, a variety of information relating to the entity's current and historical performance may be received. This information may be extracted from the entity information received from the one or more information sources (e.g., as described in step 302 of method 300). Optionally, the information related to the entity's current and historical performance may include financial performance information (step 402), market information (step 404), rating information (step 406), product and/or service information (step 408), and public sentiment information (step 410). Based on the information received in steps 402-410, a plurality of metrics that measure the entity's current performance state in a plurality of performance areas may be generated. These metrics may include a financial performance metric (step 412) based on the financial performance information, a market position metric (step 414) based on the market information, a financial health metric (step 416) based on the rating information, a product/service strength metric (step 418) based on the product and/or service information, and a public sentiment metric (step 420) based on the public sentiment information. The information received in steps 402-410, along with the metrics generated in steps 412-420, may then be used to determine performance trends related to the entity. The trends may include a financial performance trend (step 422), a market position trend (step 424), a rating trend (step 426), a product/service trend (step 428), and a public sentiment trend (step 430). The entity performance information, the current performance metrics, and/or the performance trends may be provided to a performance model (step 432), which may utilize machine learning and/or other artificial intelligence techniques to generate a performance index for the entity that captures the entity's current performance state and likely future performance state. Note that, while FIG. 4 shows the performance model (step 432) accepting the performance trends, the performance model may, in some embodiments, accept any of the upstream performance information shown in FIG. 4 (e.g., entity performance information received in steps 402-410 and performance metric information generated in steps 412-420) along with additional information or data about or related to the entity in addition to or as an alternative to the innovation trends.

Figure 5:
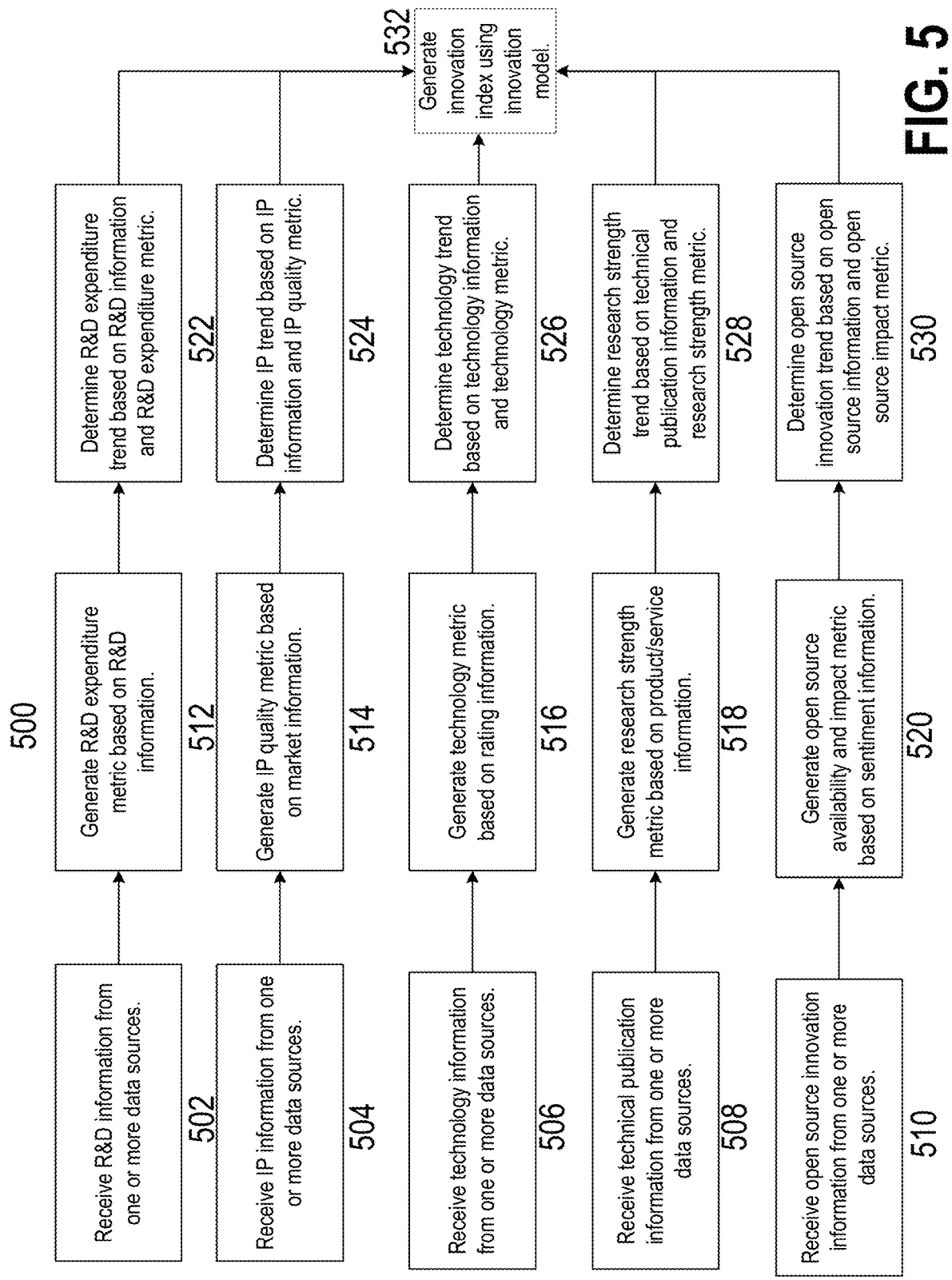
FIG. 5 shows a method for generating an innovation index, according to some embodiments of the disclosure.

The process for generating an innovation index relating to an entity may be similar to the process for generating a performance index. An exemplary method 500 for generating an innovation index is shown in FIG. 5. Like method 400, method 500 may comprise receiving a variety of information relating to the entity's current and historical innovations. This information may be extracted from the entity information received from the one or more information sources (e.g., as described in step 302 of method 300). Optionally, the information related to the entity's current and historical innovations may include research and development (R&D) information (step 502), intellectual property (IP) information (step 504), technology information (step 506), technical publication information (step 508), and open-source information (step 510). Based on the information received in steps 502-510, a plurality of metrics that measure the entity's current innovation state in a plurality of contexts may be generated. These metrics may include a research and development expenditure metric (step 512) based on the R&D information, an intellectual property metric (step 514) based on the IP information, a technology metric (step 516) based on the technology information, a research strength metric (step 518) based on the technical publication information, and an open-source availability and impact metric (step 520) based on the open-source information. The information received in steps 502-510, along with the metrics generated in steps 512-520, may then be used to determine innovation trends related to the entity. The trends may include a research and development expenditure trend (step 522), an intellectual property trend (step 524), a technology trend (step 526), a research strength trend (step 528), and an open-source innovation trend (step 530). The entity innovation information, the innovation metrics, and/or the innovation trends may be provided to an innovation model (step 532), which may utilize machine learning and/or other artificial intelligence techniques to generate an innovation index for the entity that captures the current and projected competitiveness and strength of the entity's innovations. Note that, while FIG. 5 shows the innovation model (step 532) accepting the innovation trends, the innovation model may, in some embodiments, accept any of the upstream innovation information shown in FIG. 5 (e.g., entity innovation information received in steps 502-510 and innovation metric information generated in steps 512-520) along with additional information or data about or related to the entity in addition to or as an alternative to the innovation trends.

The process for generating the sustainability index may differ from the processes for generating the performance and innovation indices because the sustainability information associated with the entity that is available may be of a different information type than the performance information and the innovation information. Specifically, the sustainability information may comprise third-party assessments or measurements of the entity's sustainable practices (or lack thereof). Generating the sustainability index for the entity may therefore involve processing and combining a plurality of third-party sustainability metrics to produce a comprehensive measure of the entity's commitment to sustainability.

Figure 6:
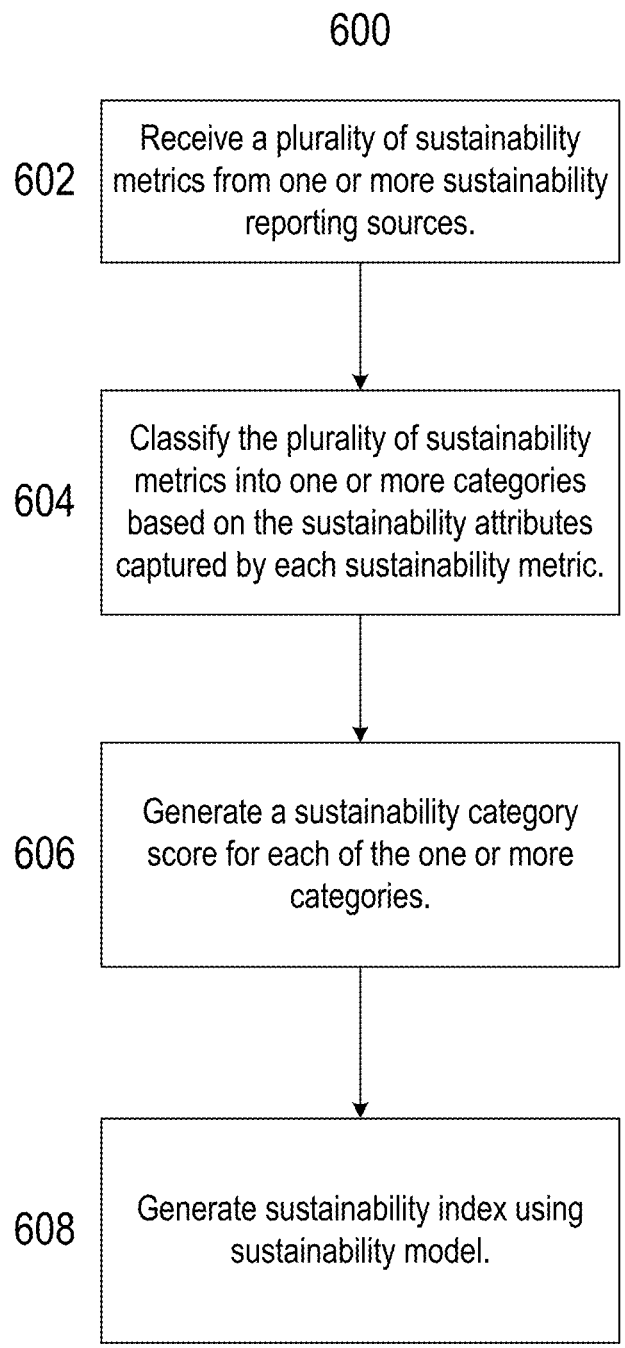
FIG. 6 shows a method for generating a sustainability index, according to some embodiments of the disclosure.

FIG. 6 illustrates an exemplary method 600 for generating a sustainability index for an entity. As shown, a plurality of sustainability metrics may be received from one or more sustainability reporting sources (step 602). The plurality of sustainability metrics may be classified into one or more categories based on the specific sustainability attributes captured by each sustainability metric (step 604). Example sustainability attributes captured by a sustainability metric may include pollution production, ecological footprint, and green energy use. Optionally, the classification of the sustainability metrics may be performed using a trained classifier. After the sustainability metrics are categorized, each category may be scored, for example based on the scope or importance of the metrics in each category (step 608). The sustainability metrics, the one or more categories, and the category scores may then be provided to a sustainability model (step 608), which may utilize machine learning and/or other artificial intelligence techniques to generate a sustainability index for the entity that captures the entity's current and projected commitment to sustainable practices.

Optionally, the sustainability model (step 608) may accept inputs in addition to the sustainability metrics, the categories, and the category scores. For example, the sustainability model may receive underlying sustainability attribute data associated with the entity, such as data associated with the entity's budget for improving its sustainable practices, data associated with the entity's energy use, or data associated with the entity's carbon footprint (e.g., data that indicates the total amount of greenhouse gases generated by the entity over a particular period of time or as a result of providing a particular product or service). Additionally, the sustainability model may accept sustainability trend data that indicates one or more trends in sustainability attributes associated with the entity, for instance data that indicates trends in the entity's use of fossil fuels. In some embodiments, sustainability attribute data and/or sustainability trend data may be extracted from the sustainability metrics received in step 602. In some embodiments, sustainability attribute data and/or sustainability trend data may be extracted from other information sources (e.g., government sources).

As shown in FIG. 4, in addition to generating the performance index, the innovation index, and the sustainability index, the one or more machine learning models may be configured to generate a confidence level for the performance index ($C_P$), a confidence level for the innovation index ($C_I$), and a confidence level for the sustainability index ($C_S$). The confidence levels for the performance index, the innovation index, and the sustainability index may be a numerical value or range of numerical values that correspond to uncertainties associated with the accuracies of each index. Generating confidence levels for the performance, innovation, and sustainability indices may account for uncertainty that may be present within the entity information and may, as a result, increase the reliability and transparency of the method 300.

Once generated in step 304, the performance index, the innovation index, and the sustainability index may be used to generate the entity trust index (TI) for the entity (step 306). The entity trust index may be a numerical value that indicates an overall trustworthiness level of the entity based on the measurements of the entity's performance, the entity's innovations, and the entity's commitment to sustainability. Optionally, the entity trust index may be a numerical value in the range 0-1, 0-5, 0-10, 0-20, 0-30, 0-40, 0-50, 0-60, 0-70, 0-80, 0-90, or 0-100.

In some embodiments, the entity trust index may be or may depend upon a weighted combination of the performance index, the innovation index, and the sustainability index. For example, in some embodiments, the entity trust index may be computed according to the following equation:

$$TI = a_P P + a_I I + a_S S \quad (1)$$

where $a_P$, $a_I$, and $a_S$ are weight values that scale the performance index (P), the innovation index (I), and the sustainability index (S), respectively, according to the relative importance of each trust dimension to the trustworthiness of the entity. The weight values may vary based on characteristics of the entity for which the entity trust index is being generated. For instance, the weight values may depend on the entity type or on the industry sector to which the entity belongs. In some embodiments, the weight values may be pre-programmed in the system that generates the entity trust index (e.g., system 100). In other embodiments, the weight values may be provided by the party that requested the generation of entity trust index.

After the entity trust index is generated in step 306, a confidence score for the entity trust index ($C_{TI}$) may be generated in a step 308. The confidence score for the entity trust index may be a numerical value or range of numerical values that corresponds to uncertainty associated with the accuracy of the entity trust index. In some embodiments, the confidence score for entity trust index may be or may depend upon a weighted combination of the confidence level of the performance index, the confidence level of the innovation index, and the confidence level of the sustainability index generated in step 304. For example, in some embodiments, the confidence score for the entity trust index may be computed according to the following equation:

$$C_{TI} = a_P C_P + a_I C_I + a_S C_S \quad (2)$$

where $a_P$, $a_I$, and $a_S$ are weight values that scale the performance index (P), the innovation index (I), and the sustainability index (S), respectively, according to the relative importance of each trust dimension to the trustworthiness of the entity. These weight values may be the same weight values that can be used in equation (1) to compute the entity trust index.

Optionally, after generating the entity trust index (step 306) and the confidence score for the entity trust index (step 308), one or more recommendations may be generated (step 310). The recommendations that are generated may depend on the party that requested the generation of the entity trust index. For example, if the entity itself requested the generation of the entity trust index, the recommendations may indicate possible courses of action that can be taken by the entity to improve the entity trust index. The suggested courses of action may include changes to business strategies or behaviors (e.g., supply plans or production plans for products), changes to innovation strategies or behaviors (e.g., changes to research and development funding), or changes to strategies or behaviors related to sustainability (e.g., changes to manufacturing processes to reduce production of pollutants by the entity). If a party interested in engaging with the entity (e.g., a potential customer of the entity) requested the generation of the entity trust index, the recommendations may indicate whether or not the party should engage with the entity, to what extend the party should engage with the entity, or alternative entities that the party should engage with instead.

In some embodiments, generating the recommendations may comprise identifying the entity's weakest trust dimension, for example by identifying which of the performance index, the sustainability index, and the innovation index has the lowest value. After identifying the entity's weakest trust dimension, the entity information associated with that trust dimension may be traced and evaluated to identify specific issues or areas for improvement that may have contributed to the index's low value. Specific suggestions for improving the index may then be generated based on the identified issues.

In some embodiments, generating the recommendations may comprise comparing the entity trust index, the performance index, the sustainability index, and/or the innovation index with one or more target threshold value(s) to determine whether a particular action is needed. The target threshold value(s) for an index may be a highest index value or a lowest index value held by the entity's peers. In other words, generating the recommendations may comprise comparing the entity trust index, the performance index, the sustainability index, and/or the innovation index to the best index values and the worst index values held by entities in the same industry or field as the entity of interest. A system for generating an entity trust index may automatically access database (see, e.g., databases 116 shown in FIG. 1) storing a set of rules that associate differences between index values and target threshold values with predetermined actions. The recommendations may be provided based on the comparisons between the index values and the target threshold values and the set of rules.

In some embodiments, step 310 may be performed (at least partially) by a machine learning model that has been trained to generate recommendations using the entity trust index, the performance, innovation, and sustainability indices, and the entity information. Recommendations generated by the machine learning model may be based upon actions that similar entities have taken to improve their trustworthiness.

After the recommendations are generated in step 310, method 300 may proceed to step 312, wherein one or more automated actions may be executed based on the recommendations. Exemplary automated actions that can be taken include:

- automatically generating a proposed budget (based on, e.g., recent budget information) for the entity that increases the funds allocated toward areas (e.g., sustainability or innovation) that require improvement or automatically contacting one or more parties associated with the management of the entity (e.g., a CEO, a product manager, an engineer, etc.) to notify them of the entity's assessed trustworthiness and the recommendations for improvement;
- automatically configuring (e.g., by creating, modifying, and/or disabling) an electronic communication interface with the entity in accordance with the recommendation, for example by automatically facilitating communications with a trusted entity and/or by reducing, disabling, or securing communications with a non-trusted entity;
- automatically configuring (e.g., by creating, modifying, and/or disabling) a physical and/or electronic security setting, for example by automatically increasing security in the presence of untrustworthy entities and/or automatically decreasing security in the presence of trustworthy entities;
- automatically monitoring the entity to determine whether recommendations generated in step 310 have been implemented by the entity;
- automatically tracking the implementation of recommendations generated in step 310 to determine whether the entity trust index (and/or other metrics, such as the underlying performance, innovation, and sustainability indices) improve as a result of the implementation;
- automatically reminding the entity to implement the recommendations generated in step 310;
- automatically prompting the entity to provide updated entity information; and/or
- automatically soliciting updated entity information from one or more entity information sources.

In addition to being used to generate recommendations, the entity trust index generated in step 306 and the confidence score for the entity trust index generated in step 308 may be used to generate a training data set for a machine learning model (step 314). The machine learning model may be trained (step 316) using the training data set to, for example, identify trustworthy entities or to categorize entities based on trustworthiness.

In some embodiments, updated entity information may be received after the entity trust index is generated. If updated entity information is received, updated performance, innovation, and sustainability indices may be generated (e.g., using methods 400-600). An updated entity trust index may then be generated based on the updated performance, innovation, and sustainability indices. Optionally, updates to the entity trust index may be configured to occur in real-time or in near real-time as new entity information becomes available.

Machine Learning Approaches and Models

The systems and methods provided herein may employ machine learning techniques at one or more points while generating an entity trust index relating to an entity. For example, machine learning models may be used to generate a performance index, an innovation index, or a sustainability index relating to an entity (e.g., as described in methods 300-600 shown in FIGS. 3-6). Machine learning models may be adept at identifying patterns from large, disparate data sets and, as a result, may be an ideal tool for producing measurements of entity performance, entity innovation, and entity sustainability.

Figure 7:
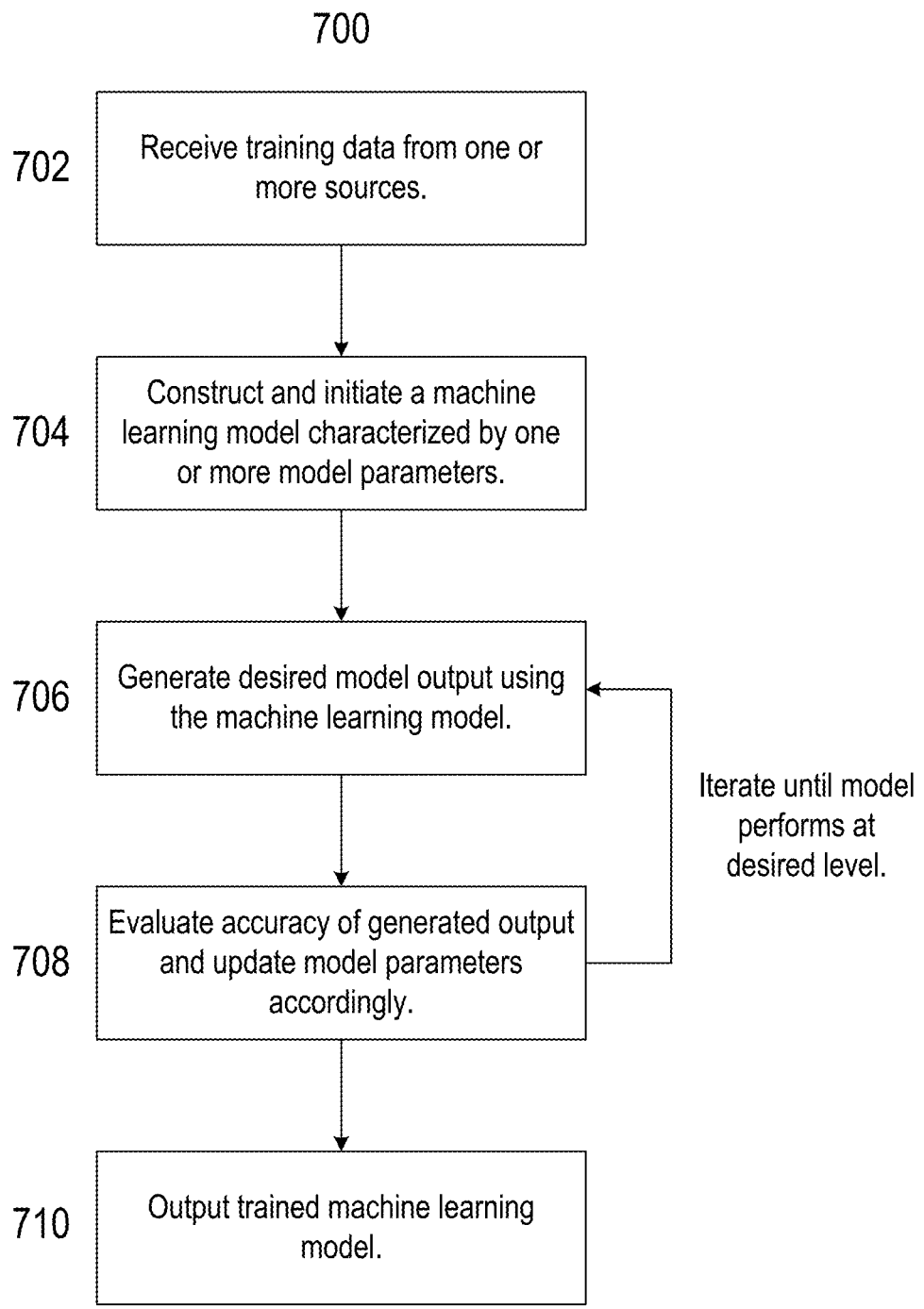
FIG. 7 shows a method for training a machine learning model, according to some embodiments of the disclosure.

FIG. 7 shows an exemplary method 700 for training a machine learning model. In some embodiments, method 700 may be executed by a system for generating an entity trust index (e.g., system 100 shown in FIG. 1). Specifically, method 700 may be used to train a performance model configured to generate a performance index for an entity, an innovation model configured to generate an innovation index, and/or a sustainability model configured to generate a sustainability index.

As shown, the first step 702 in a machine learning model may comprise receiving training data from one or more sources. The training data may mimic or exemplify the information from which the machine learning model, once trained, will be expected to generate outputs. For instance, if the machine learning model is being trained to generate a performance index for an entity, the training data may resemble entity performance information (e.g., financial performance information, market information, public sentiment information, etc.). The training data may be artificial (e.g., generated using a simulation), real, or a combination thereof. Depending on the specific training approached used to train the machine learning model (e.g., supervised, unsupervised, or semi-supervised), one or more portions of the training data may be labeled with a corresponding output value. For example, performance indices may be assigned to training data used to train a machine learning model to generate a performance index so that the machine learning model can learn the relationships between performance information and performance index values.

Next, in a step 704, the machine learning model may be constructed and initialized. The type of machine learning model may depend on the type of output that is desired from the model. The machine learning model may be characterized by one or more model parameters that may determine the manner in which the model processes data to generate outputs.

After the machine learning model has been constructed and initialized, it may be used to generate desired outputs based on the training data (step 706). The accuracy of the outputs generated by the machine learning model may then be evaluated; based on the results of the evaluation, one or more of the model parameters that characterize the machine learning model may be updated (step 708). Method 700 may be configured to iteratively repeat steps 706-708 until one or more cessation conditions are met. For example, method 700 may cycle through steps 706-708 until the accuracies of the outputs generated by the machine learning model are determined to exceed a threshold accuracy level. Once the cessation conditions are met, the (now trained) machine learning model may be output (step 710) and used to generate outputs for new, previously unseen data.

Figure 8A:
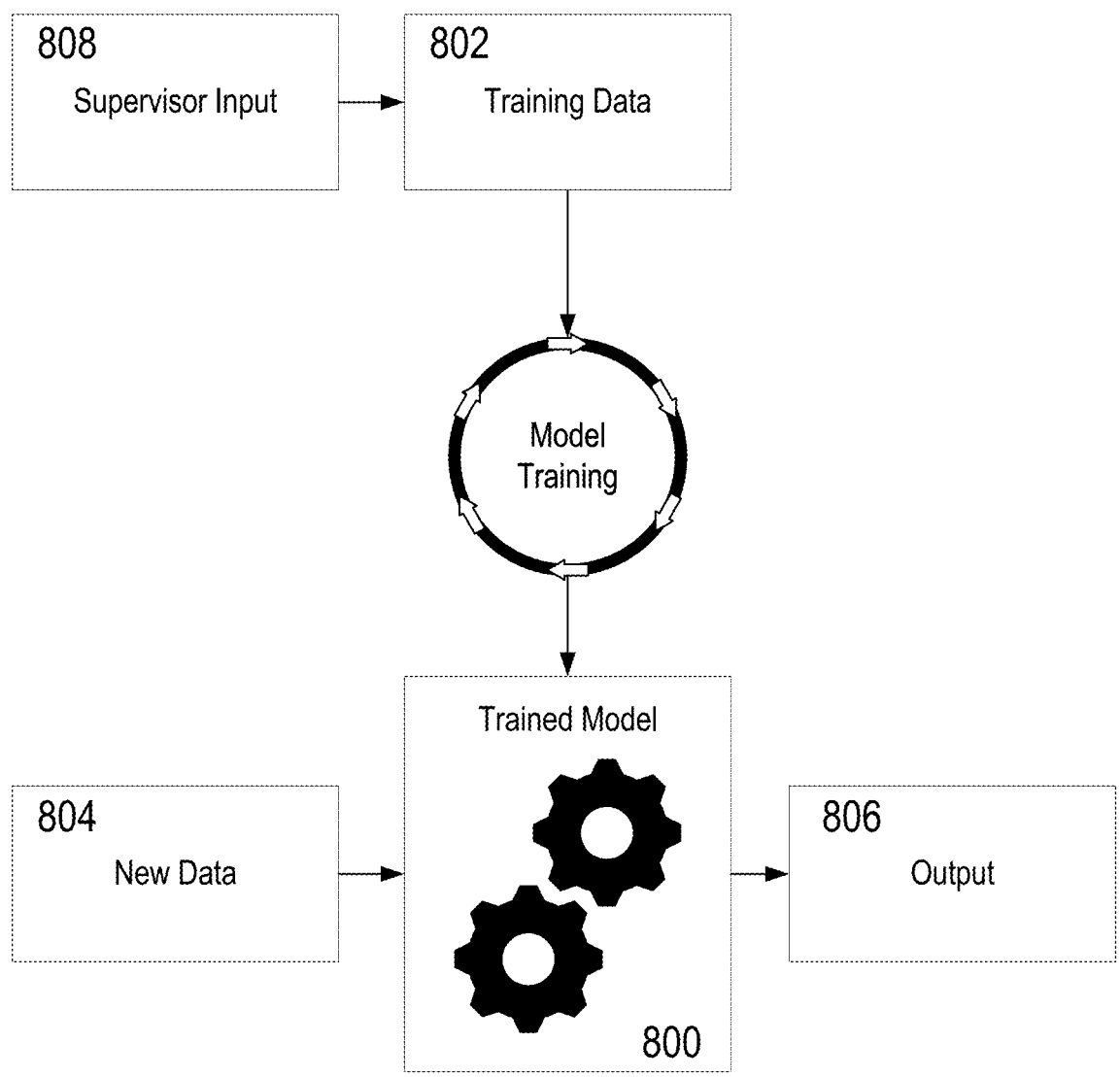
FIG. 8A shows a schematic of an exemplary machine learning approach, according to some embodiments of the disclosure.
Figure 8B:
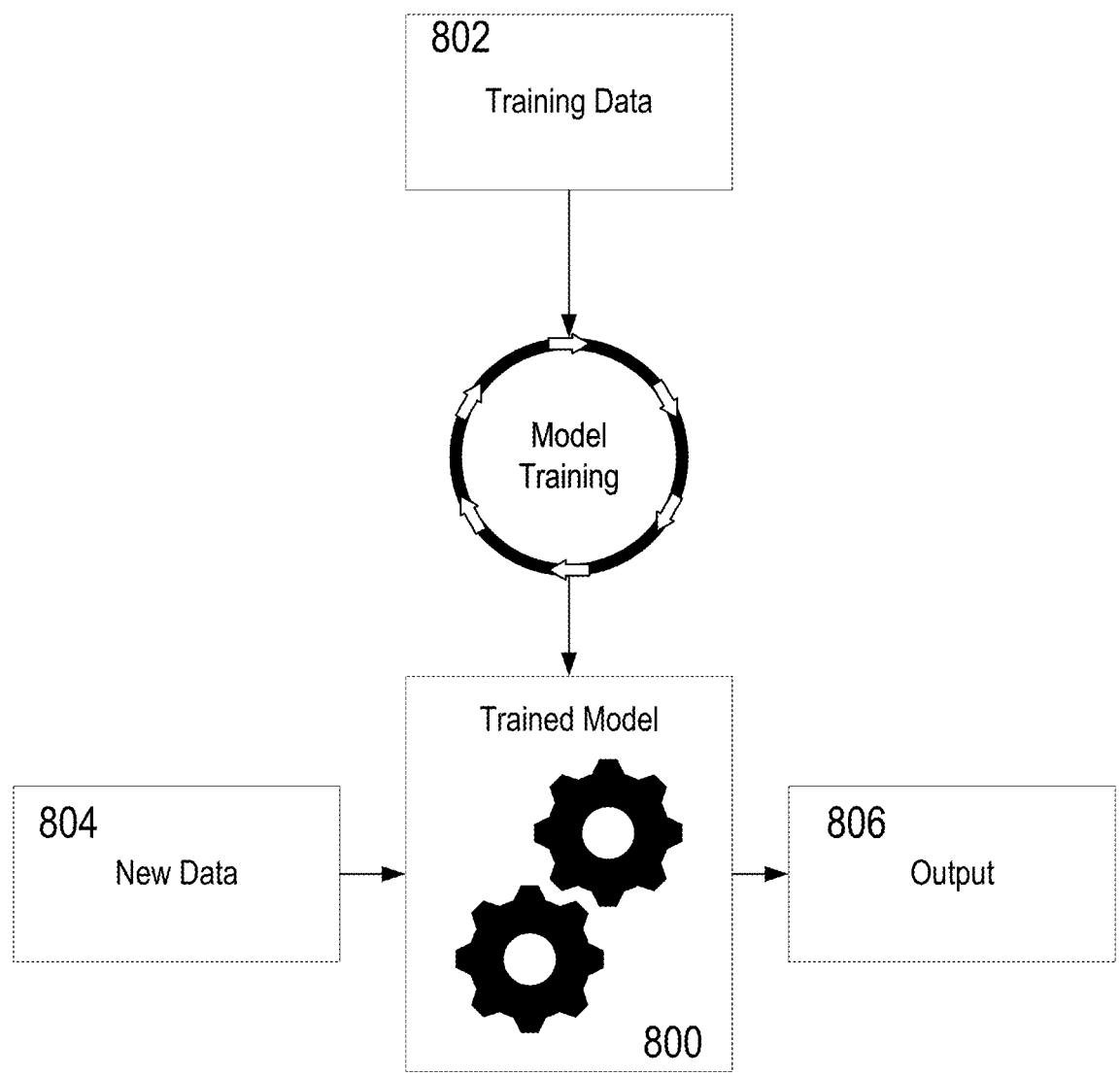
FIG. 8B shows a schematic of an exemplary machine learning approach, according to some embodiments of the disclosure.

FIGS. 8A-8B illustrate exemplary training approaches for training a machine learning model. Specifically, FIG. 8A shows a supervised training approach, while FIG. 8B shows an unsupervised training approach.

In both supervised and unsupervised training approaches, training data 802 may be used to produce a trained model 800. Once trained, model 800 may be capable of producing outputs 806 based on new, previously unseen data 804.

In a supervised training approach, supervisor input 808 may be applied to training data 802 before training data 802 is used to train the model. The model may learn to associate training data 802 with certain output values based on information provided by supervisor input 808.

In an unsupervised training approach, on the other hand, training data 802 may receive no supervisor input prior to being used for model training. In such cases, the model may learn how to generate outputs by mimicking patterns and relationships in training data 802.

The systems and methods described herein may, in one or more examples, employ machine learning model types and/or architectures, including artificial neural networks, deep learning models, linear regression models, non-linear regression models, classifiers, and/or clustering models. Exemplary outputs from some common machine learning model types are shown in FIGS. 9A-9C-specifically, outputs from a classification model (9A), a clustering model (9B), a linear regression model (9C), and a non-linear regression model (9D). In some embodiments, the provided systems and methods may also employ techniques such as social listening or natural language processing.

Computer System

Figure 10:
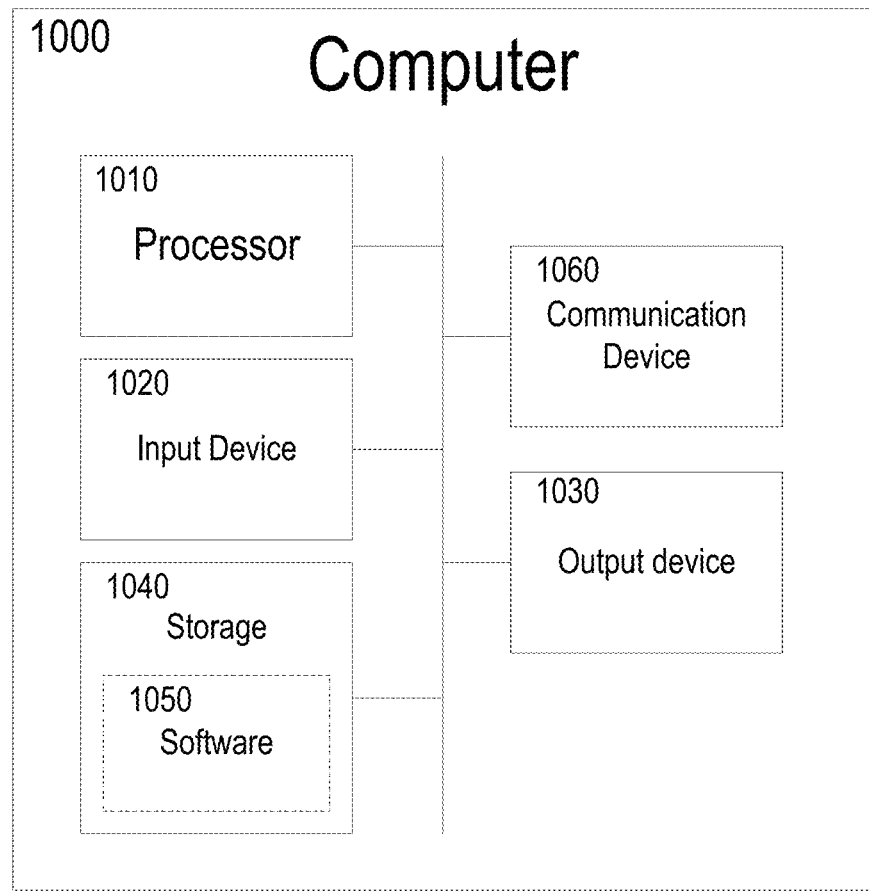
FIG. 10 shows an exemplary computer system, according to some embodiments of the disclosure.

In one or more examples, the disclosed systems and methods utilize or may include computer system. FIG. 10 illustrates an exemplary computing system according to one or more examples of the disclosure. Computer 1000 can be a host computer connected to a network. Computer 1000 can be a client computer or a server. As shown in FIG. 10, computer 1000 can be any suitable type of microprocessor-based device, such as a personal computer, workstation, server, or handheld computing device, such as a phone or tablet. The computer can include, for example, one or more of processor 1010, input device 1020, output device 1030, storage 1040, and communication device 1060. Input device 1020 and output device 1030 can correspond to those described above and can either be connectable or integrated with the computer.

Input device 1020 can be any suitable device that provides input, such as a touch screen or monitor, keyboard, mouse, or voice-recognition device. Output device 1030 can be any suitable device that provides an output, such as a touch screen, monitor, printer, disk drive, or speaker.

Storage 1040 can be any suitable device that provides storage, such as an electrical, magnetic, or optical memory, including a random-access memory (RAM), cache, hard drive, CD-ROM drive, tape drive, or removable storage disk. Communication device 1060 can include any suitable device capable of transmitting and receiving signals over a network, such as a network interface chip or card. The components of the computer can be connected in any suitable manner, such as via a physical bus or wirelessly. Storage 1040 can be a non-transitory computer-readable storage medium comprising one or more programs, which, when executed by one or more processors, such as processor 1010, cause the one or more processors to execute methods described herein.

Software 1050, which can be stored in storage 1040 and executed by processor 1010, can include, for example, the programming that embodies the functionality of the present disclosure (e.g., as embodied in the systems, computers, servers, and/or devices as described above). In one or more examples, software 1050 can include a combination of servers such as application servers and database servers.

Software 1050 can also be stored and/or transported within any computer-readable storage medium for use by or in connection with an instruction execution system, apparatus, or device, such as those described above, that can fetch and execute instructions associated with the software from the instruction execution system, apparatus, or device. In the context of this disclosure, a computer-readable storage medium can be any medium, such as storage 1040, that can contain or store programming for use by or in connection with an instruction execution system, apparatus, or device.

Software 1050 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include but is not limited to, an electronic, magnetic, optical, electromagnetic, or infrared wired or wireless propagation medium.

Computer 1000 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computer 1000 can implement any operating system suitable for operating on the network. Software 1050 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

CONCLUSION

The foregoing description, for the purpose of explanation, has been described with reference to specific embodiments and/or examples. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

Any of the systems, methods, techniques, and/or features disclosed herein may be combined, in whole or in part, with any other systems, methods, techniques, and/or features disclosed herein.

The invention claimed is:

1. A method for generating an entity trust index relating to an entity, the method comprising:
receiving entity information from one or more information sources;
automatically, in response to receiving the entity information, generating, using the entity information and one or more machine learning models:
a performance index (P) that corresponds to a current performance state of the entity and a likely future performance state of the entity,
an innovation index (I) that corresponds to a competitiveness of the entity's innovations, and
a sustainability index (S) that corresponds to a level of commitment by the entity to sustainable practices; and
automatically, in response to generating the performance index, the innovation index, and the sustainability index, generating an entity trust index (TI) that indicates a trustworthiness level of the entity based on the performance index, the innovation index, and the sustainability index.

2. The method of claim 1, comprising determining, for the entity, based on the entity trust index, one or more actions for the entity that will modify the entity trust index.

3. The method of claim 2, wherein determining the one or more actions for the entity that will modify the entity trust index comprises:
receiving, from a rules database, a plurality of rules associating actions for the entity with deviations of the entity trust index from a target trust index value;
comparing the entity trust index to the target trust index value; and
selecting the one or more actions for the entity based on a difference between the entity trust index and the target trust index value and a rule of the plurality of rules that corresponds to the difference between the entity trust index and the target trust index value.

4. The method of claim 2, wherein the one or more actions for the entity are further based on the performance index, the innovation index, and the sustainability index.

5. The method of claim 1, comprising automatically, in response to receiving the entity information, generating, using entity information and the one or more machine learning models:
a confidence level of the performance index ($C_P$) that corresponds to uncertainty associated with an accuracy of the performance index;
a confidence level of the innovation index ($C_I$) that corresponds to uncertainty associated with an accuracy of the innovation index; and
a confidence level of the sustainability index ($C_S$) that corresponds to uncertainty associated with an accuracy of the sustainability index.

6. The method of claim 5, wherein each of the one or more information sources has an associated uncertainty measure, and wherein one or more of the confidence level of the performance index, the confidence level of the innovation index, and the confidence level of the sustainability index are generated using uncertainty measures of at least one of the one or more information sources.

7. The method of claim 5, comprising automatically, in response to generating the confidence level of the performance index, the confidence level of the innovation index, and the confidence level of the sustainability index, generating a confidence score for the entity trust index ($C_{TI}$) that corresponds to uncertainty associated with an accuracy of the entity trust index.

8. The method of claim 7, comprising determining, for the entity, based on the entity trust index and the confidence score for the entity trust index, one or more actions for the entity that will modify the entity trust index.

9. The method of claim 1, comprising:
receiving, from the one or more information sources, updated entity information;
automatically, in response to receiving the updated entity information, generating, using the updated entity information and the one or more machine learning models, one or more of:
an updated performance index;
an updated innovation index; and
an updated sustainability index; and
automatically, in response to generating one or more of the updated performance index, the updated innovation index, and the updated sustainability index, generating an updated entity trust index that indicates an updated trustworthiness level of the entity based on the updated performance index, the updated innovation index, and/or the updated sustainability index.

10. The method of claim 1, wherein the steps of receiving the entity information, generating the performance index, the innovation index, and the sustainability index, and generating the entity trust index are performed in real-time.

11. The method of claim 1, wherein generating the entity trust index comprises determining a weighted combination of the performance index, the innovation index, and the sustainability index.

12. The method of claim 11, wherein, in the weighted combination:
the performance index is weighted by a performance weight ($a_p$) that corresponds to a relative importance of the current performance state of the entity and the likely future performance state of the entity to the trustworthiness level of the entity;
the innovation index is weighted by an innovation weight ($a_i$) that corresponds to a relative importance of the competitiveness of the entity's innovations to the trustworthiness of the entity; and
the sustainability index is weighted by a sustainability weight ($a_s$) that corresponds to a relative importance of the level of commitment by the entity to sustainable practices innovations to the trustworthiness of the entity.

13. The method of claim 12, wherein the entity trust index is given by the following equation: $TI=a_pP+a_iI+a_sS$.

14. The method of claim 1, wherein the entity trust index is a number between 0 and 1.

15. The method of claim 1, comprising training the one or more machine learning models to generate the performance index, the innovation index, and the sustainability index.

16. The method of claim 1, wherein generating the performance index comprises:
generating one or more current performance metrics corresponding to the current performance state of the entity using the entity information; and
determining performance trend information corresponding to the likely future performance state of the entity based on the one or more current performance metrics;
wherein the one or more machine learning models generate the performance index using the one or more current performance metrics and the performance trend information.

17. The method of claim 1, wherein generating the innovation index comprises:
generating one or more current innovation metrics corresponding to a current innovation state of the entity using the entity information;
determining innovation trend information corresponding to a likely future innovation state of the entity based on the one or more current innovation metrics;
wherein the one or more machine learning models generate the innovation index using the one or more current innovation metrics and the innovation trend information.

18. The method of claim 1, wherein generating the sustainability index comprises:
extracting a plurality of sustainability metrics from the entity information, wherein each of the plurality of sustainability metrics is associated with one or more sustainability attributes;
classifying the plurality of sustainability metrics into one or more categories based on the sustainability attributes associated with each sustainability metric; and
generating a sustainability category score for each of the one or more categories;
wherein the one or more machine learning models are configured to generate the sustainability index using the sustainability category scores for each of the one or more categories.

19. The method of claim 1, wherein the entity information comprises entity performance information.

20. The method of claim 19, wherein the entity performance information comprises one or more of: market information associated with the entity, product/service information associated with the entity, and public sentiment information associated with the entity.

21. The method of claim 1, wherein the entity information comprises entity innovation information.

22. The method of claim 21, wherein the entity innovation information comprises one or more of: research and development information associated with the entity, intellectual property information associated with the entity, technical publication information associated with the entity, and open-source innovation information associated with the entity.

23. The method of claim 1, wherein the entity information comprises publicly available information.

24. The method of claim 23, wherein the one or more information sources comprise one or more of: a public disclosure, an agency rating, a government database, a news outlet, an investment analysis, a customer review, a user forum, and a social media platform.

25. The method of claim 1, wherein the entity is a product, a technology, a service, an individual, an institution, or a company.

26. The method of claim 1, comprising automatically configuring a physical or electronic security setting for a party associated with the entity based on the entity trust index.

27. The method of claim 1, comprising automatically configuring an electronic communication interface between the entity and a party associated with the entity based on the entity trust index.

28. A system for generating an entity trust index relating to an entity, the system comprising one or more processors configured to:
receive entity information from one or more information sources;
automatically, in response to receiving the entity information, generate, using the entity information and one or more machine learning models:
a performance index (P) that corresponds to a current performance state of the entity and a likely future performance state of the entity,
an innovation index (I) that corresponds to a competitiveness of the entity's innovations, and
a sustainability index (S) that corresponds to a level of commitment by the entity to sustainable practices; and
automatically, in response to generating the performance index, the innovation index, and the sustainability index, generate an entity trust index (TI) that indicates a trustworthiness level of the entity based on the performance index, the innovation index, and the sustainability index.

29. A non-transitory computer readable storage medium storing instructions for generating an entity trust index relating to an entity, wherein the instructions, when executed by one or more processors of an electronic device, cause the device to:
receive entity information from one or more information sources;

automatically, in response to receiving the entity information, generate, using the entity information and one or more machine learning models:
- a performance index (P) that corresponds to a current performance state of the entity and a likely future performance state of the entity,
- an innovation index (I) that corresponds to a competitiveness of the entity's innovations, and
- a sustainability index (S) that corresponds to a level of commitment by the entity to sustainable practices; and automatically, in response to generating the performance index, the innovation index, and the sustainability index, generate an entity trust index (TI) that indicates a trustworthiness level of the entity based on the performance index, the innovation index, and the sustainability index.

* * * * *